Dec. 7, 1954 D. J. CRETZLER 2,696,350
FLOW MODULATING VALVE
Filed Sept. 19, 1949
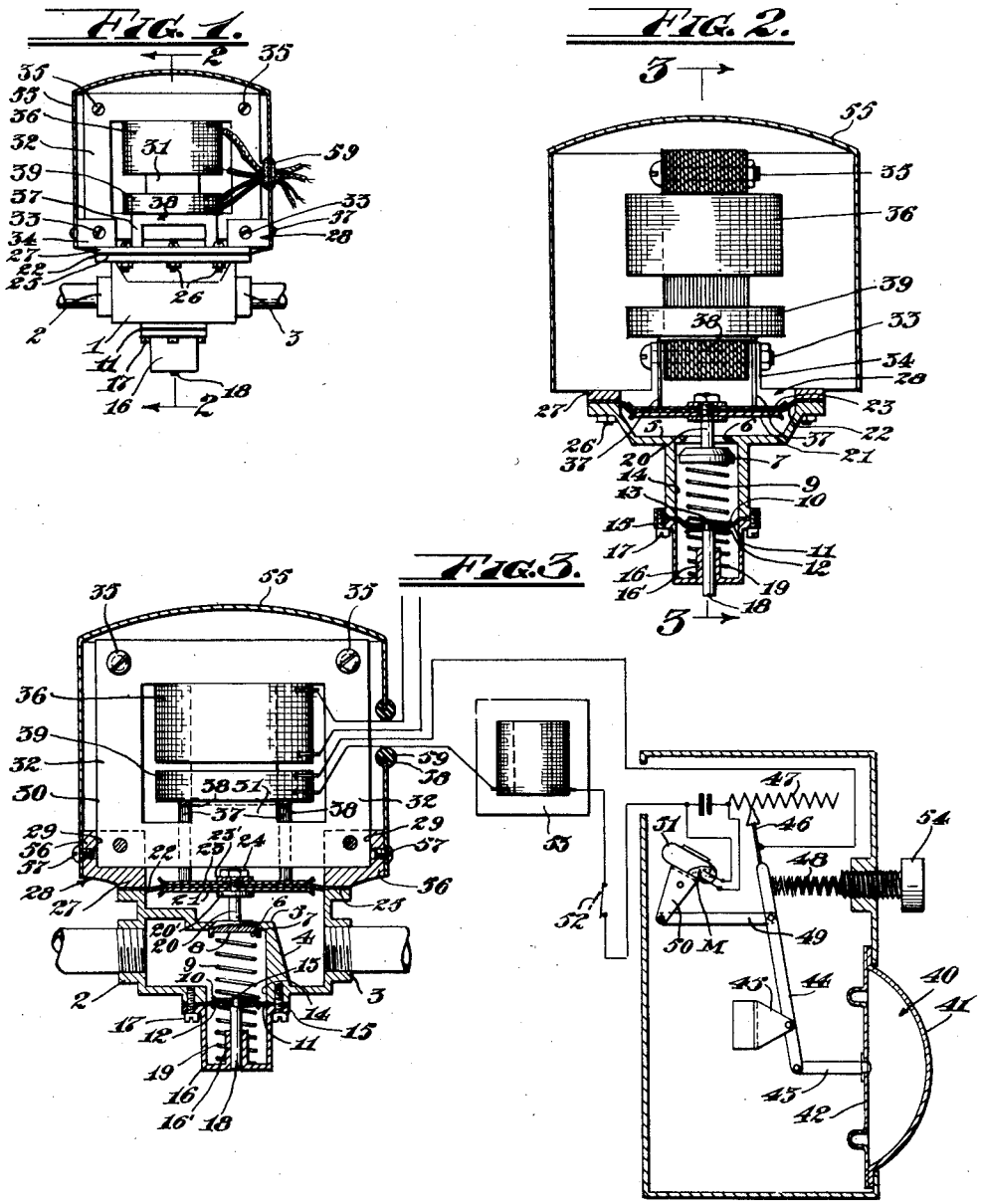
Inventor
Donald J. Cretzler.
By
Harold J. LeVesconte
Atty.

United States Patent Office 2,696,350
Patented Dec. 7, 1954

2,696,350

FLOW MODULATING VALVE

Donald J. Cretzler, Long Beach, Calif., assignor to Milwaukee Gas Specialty Company, Milwaukee, Wis., a corporation of Wisconsin Application September 19, 1949, Serial No. 116,553

10 Claims. (Cl. 236—75)

This invention relates to modulating controls for fluid flow and particularly to a modulating control which is responsive to variations other than the pressure of the fluid controlled. Specifically, the illustrated form of the invention relates to a gas flow control valve of the modulating type which is responsive to variations in temperature rather than the pressure of the gas, but it will be realized that other controls may be substituted therefor.

Heretofore, in gas heating units a thermostat governed control means has been employed and in general the control means has been of the "on and off" type in which the burner is caused to operate when the thermostat reached a predetermined minimum point and is maintained in operation until the thermostat reached a predetermined maximum point, at which time the flow of fuel would be completely cut off. Important fuel savings could be effected if the controlling means were of the modulating type in which the rate of flow of gas to the burner varied constantly in response to the action of a thermostat control since the fuel consumption at any given moment would be only that which was required to maintain the temperature at some given point. There would be no lag or lead of the fuel consumption and practically no variations in the temperature of the room or other space being heated.

With these considerations in mind, it is an object of the present invention to provide a modulating fluid flow control valve, the movement of which is directly and continuously responsive to a control means responsive to variations other than the fluid pressure.

Another object of the invention is to provide a modulating fluid flow control valve and a control therefor, which control includes safety means operative, when the fluid flow reaches a minimum point, to automatically disable the control.

Another object of the invention is to provide a modulating gas flow control valve and a control therefor which control includes safety means operative, when the gas flow reaches a point which is nearly insufficient to sustain combustion, to automatically disable the control and thereby to shut the burner completely off.

A further object of the invention is to provide a gas flow control valve of the modulating type which is electrically operated and in which the control means is electrically connected to the valve by a low voltage induced current derived from the valve operating means.

Still another object of the invention is to provide a gas flow control valve of the modulating type which is simple in construction, reliable in operation, which is economical to manufacture, and which does not require a high degree of skill to install.

With the above objects in view, together with such other objects and advantages as may subsequently appear, the invention resides in the parts, and in the construction, combination and arrangement of parts disclosed in the following specification and illustrated in the accompanying drawings which show by way of example one mode of execution of the invention and in which drawings:

Fig. 1 is a side elevation of a modulating gas flow control valve embodying the invention; a portion of the casing being broken away to show internal parts, Fig. 2 is a medial vertical elevation, slightly enlarged, taken on the line 2—2 of Fig. 1; the valve being shown in open position, and Fig. 3 is a medial side elevation taken on the line 3—3 of Fig. 2 but showing the valve in closed position and additionally, showing somewhat diagrammatically a thermo-responsive control means operatively connected to the valve operating means.

Referring to the drawings, the gas valve portion of the invention comprises a valve body 1 having an inlet port 2 and an outlet port 3 affording means whereby the valve can be installed in series in a gas line. Interiorly, the valve body 1 is divided into two compartments by a wall 4 which extends upwardly and thence laterally at 5 and the lateral portion of this wall is provided with a frusto-conical valve seat 6 with which a poppet type valve 7 cooperates to vary the flow of gas from the inlet to the outlet port. The valve 7, on its lower face, is provided with a shallow circular depression 8 which engages the upper end of a spring 9 and the lower end of this spring engages a shallow, dish shaped disc 10 mounted on one side of the diaphragm 11 with an inverted dish shaped member 12 on the opposite side of the diaphragm by a rivet or the like 13 (see Figs. 2 and 3). The valve body 1 is provided with an opening 14 which is an axial alignment with the axis about which the valve seat 6 is generated. The flanges of the diaphragm 11 extend across the base of the valve body adjacent the opening 14 and are clamped thereto by the outwardly extending flange 15 of a cup shaped spring retaining member 16 secured to the body of the valve by screws 17, thus making a gas tight joint. The member 16 is provided with an axially disposed sleeve 16' which affords guidance for a rod 18 fixed to the center of the dish shaped element 12 and thus operates to prevent any tilting of the diaphragm. Additionally, the member 16 provides a housing for a compression spring 19, the upper end of which engages the dish shaped element 12.

The valve 7 includes a stem 20 carrying a washer 20' and the stem of this valve beyond the washer extends in order through the centers of a disc 21, a diaphragm 22, a second disc 23, and a washer 23'. The end of the valve stem 20 is threaded and a nut 24 clamps the discs 21 and 23 and the diaphragm together. The diaphragm 22 extends over the top face or flange 25 of the valve body 1 and is clamped thereto by bolts 26 which secure the flange 27 of a transformer core supporting member 28 to the top face or flange 25 of the valve body; the edges of the diaphragm 22 serving also as a gasket to provide a gas tight construction at this point.

The member 28 above the flange 27 is provided with diametrically opposite shallow rectangular recesses 29, 29, which receive the opposite ends of a transformer core 30 formed of alternately reversed E-sections arranged to provide a center section 31 and side sections 32, 32. Bolts 33, 33 extending through the side walls 34 of the member 28 which form the recesses 29, 29, and through the laminations of the transformer core serve to hold one end of the core assembled and secured to the member 28. Other bolts 35, 35 secure the opposite ends of the core laminations together. Fixedly mounted on the upper end of the center member 31 of the transformer core is a primary coil or winding 36. Loosely mounted on the upper surface of the disc 23 are the upwardly extending legs 37 of a coil supporting member 38 on the upper face of which is mounted a secondary coil 39 which loosely and slidably surrounds the center member 31 of the transformer core assembly. The weight of the coil 39 together with the supporting member 38, and the gas valve assembly is slightly less than the force exerted by the springs 9 and 19 and which thus tend to hold the valve in a closed position.

The control means illustrated includes a bulb 40 having a rigid face 41 and an expansible diaphragm 42; the interior of the bulb being filled with a liquid having a high coefficient of thermal expansion. The diaphragm 42 is provided with an outwardly projecting arm 43 which is pivotally connected to one end of a lever 44 mounted on a fulcrum 45. The opposite end of the lever is connected with a contact point 46 movable across a resistance coil 47. A manually adjustable spring means 48 engages the lever 44 tending constantly to move it toward the minimum resistance side of the coil 47. The lever 44 is further connected by a link 49 with a rock member 50 which member supports a mercury switch 51 which switch is so positioned as to remain closed until the contact point 46 approaches a predetermined maximum resistance position on the resistance element 47. It will be noted that as the fluid in the bulb 40 expands in response to increasing temperature, the lever 44 will be moved in a clockwise direction as viewed in Fig. 3 with the contact point 46 gradually moving toward the position of increased resistance. The primary coil 36 is connected in series with a source of alternating current. The alternating current will induce a secondary current in the coil 39, the voltage of which will be varied by the action of the contact 46 on the member 47 since, as shown in Fig. 3, the coil 39 is connected in series with the variable resistance; the mercury switch 51, a manual switch 52, and a choke coil 53. The coils 36 and 39 are so wound that when any current is flowing through the secondary coil 39, the magnetic fields of the two coils will be in opposition to each other, regardless of the reversing of polarity due to the alternating current. The less the resistance in the secondary circuit, the greater the flow of current will be and consequently the greater the opposition between the primary and secondary coils. Since the valve arrangement is very nearly balanced, the effect of this repelling action on the coil 39 will be to tend to cause the gas valve to move to a more open position. As the room temperature increases, the bulb 40 will move the lever 44 so as to increase the resistance in the secondary circuit and as this is decreased the magnetic field of the coil 39 will be decreased and the springs 9 and 19 will tend to close the valve so far as will be permitted by the opposing magnetic fields of the coils 36 and 39.

While the valve is in operation, the outlet pressure acting on the diaphragm 22 serves in part to control the closing action of the valve in addition to the forces exerted by the springs 9 and 19. If there is any variation in the inlet pressure, that variation will be momentarily reflected in a like variation in the outlet pressure, thus either tending to move the valve to a more nearly closed position or to allow the repelling action of the coils to open the valve further as such variation increases or decreases the load on the diaphragm. The result is that a substantially constant outlet pressure is maintained with the volumetric rate of flow maintained at the level required by the control means. This pressure response is desirable in the illustrated form of the invention, but it will be apparent to those skilled in the art that in some applications of the principles of the invention, the diaphragm may be dispensed with and that the valve can be operated by the springs 9 and 19 or by a single spring in combination with the electrically operated means above described.

Thus it is that any slight change in the room temperature will be quickly reflected in an increase or decrease in the voltage in the secondary circuit and this, in turn, will be reflected in a change in the position of the gas valve. The range of operation may be manually controlled by the thumb nut 54 which bears against the compression spring 48. The support for the mercury switch 51 is so proportioned that as the lever 44 is moved toward the point of maximum resistance in the secondary circuit, this switch gradually assumes a level position and a point will be reached at which the mass of mercury M will flow to the opposite end of the switch capsule, opening the secondary circuit. When this happens the springs 9 and 19 will operate immediately to close the gas valve. Other switch means, such as a micro switch, may be substituted for the mercury switch so long as the safety factor or operation is achieved. Preferably for appearance, the operating means for the valve is enclosed by a cap 55 which is attached to the upwardly extending flanges 56, 56, forming the ends of the recesses 34, 34, by appropriate means such as screws 57, 57. This cap or casing 55 is provided with a suitable opening 58 surrounded by an insulating bushing or grommet 59 through which the leads to the coils 36 and 39 extend to their respective connections.

The device is economical to operate since no appreciable current will flow through the primary coil unless the secondary circuit is closed and the secondary circuit is energized by the induced current resulting from the transformer action of the primary coil. Attention is called to the positioning of the diaphragm between the springs 9 and 19. By inserting this diaphragm the valve action is more sensitive to very low gas pressure in that the pressure on the intake side of the gas valve will operate against this diaphragm and tend to offset the action of the spring 19.

While for the purpose of illustration, I have shown a thermo responsive control, other types of controls for other purposes may be substituted therefor, so long as it serves to vary the voltage of the secondary circuit to control the action of the valve. Also, while the device illustrated is for the control of the flow of gaseous fuel, the principles will apply equally well to the control of flow of a fluid and it is to be understood that the term "flow control," or any equivalent thereof as used herein, is to be construed in the broadest sense and to include control of linear or volumetric rates of flow, or both, dependent on whether the pressure differential between the inlet and outlet sides of the valve in a particular installation is variable or constant.

While I have illustrated and described one mode of execution of my invention, it will be appreciated that in the light of these disclosures, many variations of this idea will suggest themselves to those skilled in the art, and, therefore, it is to be understood that I do not intend to limit myself to the exact form of the invention here disclosed, and that the invention embraces all such changes in the parts, and in the construction, combination and arrangement of parts as shall come within the purview of the appended claims.

I claim:

1. In an electromagnetic control device, in combination, an electromagnetic operator comprising a magnetic member, a primary winding member affording when energized magnetic flux in said magnetic member and a secondary winding member in which current is induced by said magnetic flux, a low voltage circuit supplied from said secondary winding member, condition responsive means controlling said low voltage circuit and thereby the induction of current in said secondary winding member, a valve member, one of said operator members being movable and connected to said valve member and positioned, when current is not induced in said secondary winding member so that when the current is induced in said secondary winding member the magnetic flux has maximum actuating effect on said movable member whereby to actuate said valve member with a maximum force at the beginning of its movement, and a resistance in said low voltage circuit, said condition responsive means being effective to vary said resistance and thereby the amount of induced current and the amount of movement of said valve member in proportion to the amount of change in the condition to which said condition responsive means is responsive.

2. A valve for continuously and proportionately modulating the flow of fluid in response to variable conditions; said valve including a valve body having a fluid inlet and a fluid outlet with a valve seat between said inlet and said outlet, a valve member movable toward and away from said seat and biased toward said seat, an electromagnetic operator comprising a magnetic member, a primary winding member affording when energized magnetic flux in said magnetic member and a secondary winding member in which current is induced by said magnetic flux, a low voltage circuit supplied from said secondary winding member, one of said operator members being movable and connected to said valve member and positioned when current is not induced in said secondary winding member so that when current is induced in said secondary winding member the magnetic flux has maximum actuating effect on said movable member whereby to actuate said valve member with a maximum force at the beginning of its movement, a resistance in said low voltage circuit, and condition responsive means effective to vary said resistance and thereby the amount of induced current and the amount of movement of said valve member in proportion to the amount of change in the condition to which said condition responsive means is responsive.

3. A valve for continuously and proportionately modulating the flow of fluid in accordance with claim 2 wherein the condition responsive means controlling the low voltage circuit of the secondary winding for control of the valve member comprises temperature responsive means responsive to ambient temperature remote from said valve.

4. A valve for continuously and proportionately modulating the flow of fluid in accordance with claim 2 wherein there is means for disabling the low voltage circuit of said secondary winding when the current in said secondary winding has been reduced to a predetermined minimum.

5. A valve for continuously and proportionately modulating the flow of fluid in accordance with claim 2 wherein there is also pressure responsive means acting to control said valve member.

6. In an electromagnetic control device, in combination, an electromagnetic operator comprising a magnetic member, a primary winding member affording when energized magnetic flux in said magnetic member and a secondary winding member in which current is induced by said magnetic flux, a low voltage circuit supplied from said secondary winding member, condition responsive means controlling said low voltage circuit and thereby the induction of current in said secondary winding member, and a valve member, one of said operator members being movable and connected to said valve member and positioned when current is not induced in said secondary winding member so that when the current is induced in said secondary winding member the magnetic flux has maximum actuating effect on said movable member whereby to actuate said valve member with a maximum force at the beginning of its movement.

7. An electromagnetic control device comprising, in combination, a stationary magnetic member, a stationary primary winding on said member and affording when energized magnetic flux in said member, a movable secondary winding in which current is induced by said magnetic flux whereby the secondary winding is moved away from the primary winding, a low voltage circuit supplied from said secondary winding, condition responsive means controlling said low voltage circuit and thereby the induction of current in said secondary winding, a valve member actuated with a maximum force at the beginning of its movement by movement imparted to said movable secondary winding by reactive action effective on the magnetic flux afforded in said magnetic member by energization of said primary winding when current is induced in said secondary winding, and a resistance in said low voltage circuit, said condition responsive means being effective to vary said resistance and thereby the amount of induced current and the amount of movement of said valve member in proportion to the amount of change in the condition to which said condition responsive means is responsive.

8. A valve for control of fuel to fluid fuel burning apparatus, said valve including a valve body having an inlet and an outlet with a valve seat between said inlet and said outlet, an electromagnetic operator for said valve comprising a magnetic member, a stationary primary winding affording when energized magnetic flux in said member, a movable secondary winding having a circuit supplied therefrom, said magnetic flux inducing a current in said secondary winding when said circuit is closed, whereby the secondary winding is moved away from the primary winding, circuit controlling means in said circuit controlling induction of current in said secondary winding, said circuit controlling means being responsive to temperature effected by burning of said fuel, and a valve member cooperable with said valve seat and actuated from one position to another with a maximum force at the beginning of its movement by movement imparted to said movable secondary winding by reactive action effective on the magnetic flux afforded in said magnetic member by energization of said primary winding when current is induced in said secondary winding for control of flow of said fuel in accordance with said temperature responsive control means controlling said circuit.

9. An electromagnetic control device comprising, in combination, a stationary magnetic member, a primary winding on said member and affording when energized magnetic flux in said member, a secondary winding in which current is induced by said magnetic flux, at least one of said windings having movement away from the other winding when current is induced in said secondary winding, a low voltage circuit supplied from said secondary winding, condition responsive means controlling said low voltage circuit and thereby the induction of current in said secondary winding, a valve member actuated with a maximum force at the beginning of its movement by movement imparted to at least one of said windings by reactive action effective on the magnetic flux afforded in said magnetic member by energization of said primary winding when current is induced in said secondary winding, and a resistance in said low voltage circuit, said condition responsive means being effective to vary said resistance and thereby the amount of induced current and the amount of movement of said valve member in proportion to the amount of change in the condition to which said condition responsive means is responsive.

10. A valve for control of fuel to fluid fuel burning apparatus, said valve including a valve body having an inlet and an outlet with a valve seat between said inlet and said outlet, an electromagnetic operator for said valve comprising a magnetic member, a primary winding affording when energized magnetic flux in said member, a secondary winding having a circuit supplied therefrom, said magnetic flux inducing a current in said secondary winding when said circuit is closed, at least one of said windings having movement away from the other winding when current is induced in said secondary winding, circuit controlling means in said circuit for controlling induction of current in said secondary winding, said circuit controlling means being responsive to temperature effected by burning of said fuel, and a valve member cooperable with said valve seat and actuated from one position to another with a maximum force at the beginning of its movement by movement imparted to said movable winding by reactive action effective on the magnetic flux afforded in said magnetic member by energization of said primary winding when current is induced in said secondary winding for control of flow of said fuel in accordance with said temperature responsive control means controlling said circuit.

References Cited in the file of this patent

UNITED STATES PATENTS

| Number | Name | Date |
|---|---|---|
| 1,066,081 | Coleman | July 1, 1913 |
| 1,123,411 | Smith | Jan. 5, 1915 |
| 1,654,759 | Schultz | Jan. 3, 1928 |
| 1,672,193 | Bason | June 5, 1928 |
| 1,931,863 | Fonseca | Oct. 24, 1933 |
| 2,019,058 | Rippe | Oct. 29, 1935 |
| 2,044,427 | Giesler | June 16, 1936 |
| 2,090,073 | Rohlin | Aug. 17, 1937 |
| 2,212,285 | Ayers | Aug. 20, 1940 |
| 2,213,663 | Berard | Sept. 3, 1940 |
| 2,396,000 | Findley | Mar. 5, 1946 |